(12) United States Patent
Pellaton et al.

(10) Patent No.: US 10,677,093 B2
(45) Date of Patent: Jun. 9, 2020

(54) DEVICE FOR VENTILATION OF A TURBOMACHINE TURBINE CASING

(71) Applicant: SAFRAN AIRCRAFT ENGINES, Paris (FR)

(72) Inventors: Bertrand Guillaume Robin Pellaton, Moissy-Cramayel (FR); Baptiste Marie Aubin Pierre Jouy, Moissy-Cramayel (FR); Adrien Moussette, Moissy-Cramayel (FR); Loic Villard, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 141 days.

(21) Appl. No.: 15/760,219

(22) PCT Filed: Sep. 12, 2016

(86) PCT No.: PCT/FR2016/052292
§ 371 (c)(1),
(2) Date: Mar. 14, 2018

(87) PCT Pub. No.: WO2017/046499
PCT Pub. Date: Mar. 23, 2017

(65) Prior Publication Data
US 2018/0258793 A1    Sep. 13, 2018

(30) Foreign Application Priority Data
Sep. 15, 2015 (FR) ...................... 15 58619

(51) Int. Cl.
*F01D 25/14* (2006.01)
*F01D 11/24* (2006.01)
(Continued)

(52) U.S. Cl.
CPC .............. *F01D 25/14* (2013.01); *F01D 11/24* (2013.01); *F01D 25/12* (2013.01); *F02C 7/18* (2013.01);
(Continued)

(58) Field of Classification Search
CPC .......... F01D 25/12; F01D 25/14; F01D 11/14; F01D 11/20; F01D 11/24
See application file for complete search history.

(56) References Cited

U.S. PATENT DOCUMENTS

| 4,826,397 A | 5/1989 | Shook et al. |
| 5,100,291 A | 3/1992 | Glover |

(Continued)

FOREIGN PATENT DOCUMENTS

| FR | 2766232 A1 | 1/1999 |
| WO | 2013/186757 A2 | 12/2013 |

OTHER PUBLICATIONS

Preliminary Research Report received for French Application No. 1558619, dated Jul. 4, 2016, 3 pages (1 page of French Translation Cover Sheet and 2 pages of original document).
(Continued)

*Primary Examiner* — Woody A Lee, Jr.
*Assistant Examiner* — Andrew Thanh Bui
(74) *Attorney, Agent, or Firm* — Womble Bond Dickinson (US) LLP

(57) ABSTRACT

The invention relates to a ventilation device for a turbomachine turbine casing, comprising a plurality of line sets (16') configured to spray air over the turbine casing, the line sets being arranged next to one another, each line set comprising a main ring (161) in which air circulates, the main ring (161) comprising orifices (17') configured to spray a stream of air towards the turbine casing, the line set comprising a shield (162) configured to isolate the main ring (161) from a stream
(Continued)

of air returning from the turbine casing towards the line sets after having been sprayed towards the turbine casing, the said shield (162) enveloping the main ring (161) and having orifices aligned with the orifices of the main ring (161).

7 Claims, 3 Drawing Sheets

(51) Int. Cl.
  *F01D 25/12* (2006.01)
  *F02C 7/18* (2006.01)
(52) U.S. Cl.
  CPC ...... *F05D 2240/15* (2013.01); *F05D 2250/14* (2013.01); *F05D 2250/322* (2013.01); *F05D 2260/201* (2013.01); *F05D 2260/231* (2013.01); *Y02T 50/675* (2013.01)

(56) References Cited

U.S. PATENT DOCUMENTS

| | | | | |
|---|---|---|---|---|
| 5,980,201 | A | * | 11/1999 | Benoist ............ F01D 25/14 |
| | | | | 415/115 |
| 6,149,074 | A | | 11/2000 | Friedel et al. |
| 2017/0114667 | A1 | * | 4/2017 | Sabo ................ F01D 11/24 |

OTHER PUBLICATIONS

International Search Report and Written Opinion received for PCT Patent Application No. PCT/FR2016/052292, dated Nov. 23, 2016, 19 pages (9 pages of English Translation and 10 pages of Original Document).

International Preliminary Report on Patentability received for PCT Patent Application No. PCT/FR2016/052292, dated Mar. 29, 2018, 14 pages (8 pages of English Translation and 6 pages of Original Document).

* cited by examiner

DEVICE FOR VENTILATION OF A TURBOMACHINE TURBINE CASING

GENERAL TECHNICAL FIELD

The invention relates to a device for ventilation of a turbine casing of a turbomachine, as well as a turbomachine comprising such a device.

PRIOR ART

In relation with FIG. 1, an aircraft turbomachine comprises, in known fashion,
a rotor 1 rotating in the axis of the machine and surrounded by a stator 2.

The rotor 1 and the stator 2 define between them a gas flow jet 12 which successively passes through a low-pressure compressor 3, a high-pressure compressor 4, a combustion chamber 13, a high-pressure turbine 5 and a low-pressure turbine 6.

The low-pressure turbine 6 comprises distributor stages 8 (stationary blades) attached to the turbine casing 7 and alternating with movable blade stages 9, attached to the rotor 1, in the axial direction of the machine. The turbine casing 7, which delimits the hot gas flow jet 12, is provided with abradable rings 10 facing the platform of the movable blades 9.

In order to protect the turbine casing 7 from excessive heating and to guarantee the good performance of the turbine, the turbomachine comprises a ventilation device 15 comprising several perforated manifolds 16 disposed around the external surface of the turbine casing 7. These manifolds 16 are supplied with air under pressure corresponding to a mixture of a stream of "cold" air collected in a peripheral secondary jet 30 downstream of the compressors by means of a collection point 14, which is a scoop situated in the secondary jet 30, and a stream of "hot" air collected in the hot gas flow jet 12 at the high-pressure compressor 5.

The cold air flow collected in the secondary jet 30 is transmitted toward the manifolds through a first duct 17, and the steam of hot air collected in the hot gas flow jet 12 is transmitted toward the manifold through a second duct 19. A valve 18 allows control of the permeability of the two ducts so as to control the temperature of the mixture of the two fluids derived from the two ducts. The air under pressure is sprayed through the perforations of the manifolds onto the external surface of the turbine casing and consequently cools it.

A manifold 16 is typically shaped like a ring perforated vertically above the turbine casing 7 so as to spray air onto the turbine casing 7.

The ventilation device 15 extends around the low-pressure turbine 6.

Besides the cooling of the stator casing, the ventilation device allows adjustment of the clearance between the movable blades 9 and the abradable 10. In fact, the changes of temperature of the casing cause a variation in the clearance between the movable blades and the abradable ring 10 due to the thermal dilation of the stator casing.

Now the clearance between the tips of the movable blades and the abradable rings 10 are determinants for the performance of the turbomachine.

In fact, the smaller the clearances, the smaller the flow rate bypassing the movable blades 9 and the distributors 8 and the better is the efficiency of the low-pressure turbine.

Consequently, the cooling of the turbine casing 7 has an important impact on the performance of the low-pressure turbine, and consequently of the turbomachine.

Also known are documents U.S. Pat. No. 5,100,291, WO2013186757, and U.S. Pat. No. 4,826,397 which describe ventilation devices. However, the solutions proposed in these documents does not allow performance to be sufficiently improved.

PRESENTATION OF THE INVENTION

One aim of the invention is to improve the known ventilation devices so as to improve the performance of the low-pressure turbine and therefore of the turbomachine.

To this end, the invention proposes a ventilation device of a turbomachine turbine casing, comprising a plurality of manifolds configured to spray air onto the turbine casing, the manifolds being disposed side by side, each manifold comprising a main ring in which air circulates, the main ring comprising openings configured to spray an air flow toward the turbine casing, the manifold comprising a shield configured to isolate the main ring from an air flow reflected from the turbine casing toward the manifolds after having been sprayed toward the turbine casing.

The invention is advantageously completed by the following features, taken alone or in any one of their technically possible combinations.

The shield surrounds the main ring and comprises openings aligned on the openings of the main ring.

The shield extends tangentially from the openings of the manifold, the shield being in intimate contact with the main ring at the openings.

The shield extends tangentially from the manifold from an intimate contact zone, between the manifold and the shield, diametrically opposed to the openings.

The cross-section of the shield has the shape of an ellipse.

The ellipse has a major axis twice as large as the diameter of the cross-section of the manifold.

A cavity defined between the shield and the manifold is filled with air or argon.

The invention also relates to a turbomachine comprising a turbine and a turbine casing ventilation device according to the invention.

PRESENTATION OF THE FIGURES

Other features, aims and advantages of the invention will be revealed by the description that follows, which is purely illustrative and not limiting, and which must be read with reference to the appended drawings in which, other than FIG. 1 which illustrates a schematic view of a turbomachine of the type already discussed:

In all the figures, similar elements bear identical reference symbols.

DETAILED DESCRIPTION OF THE INVENTION

Figure 1:
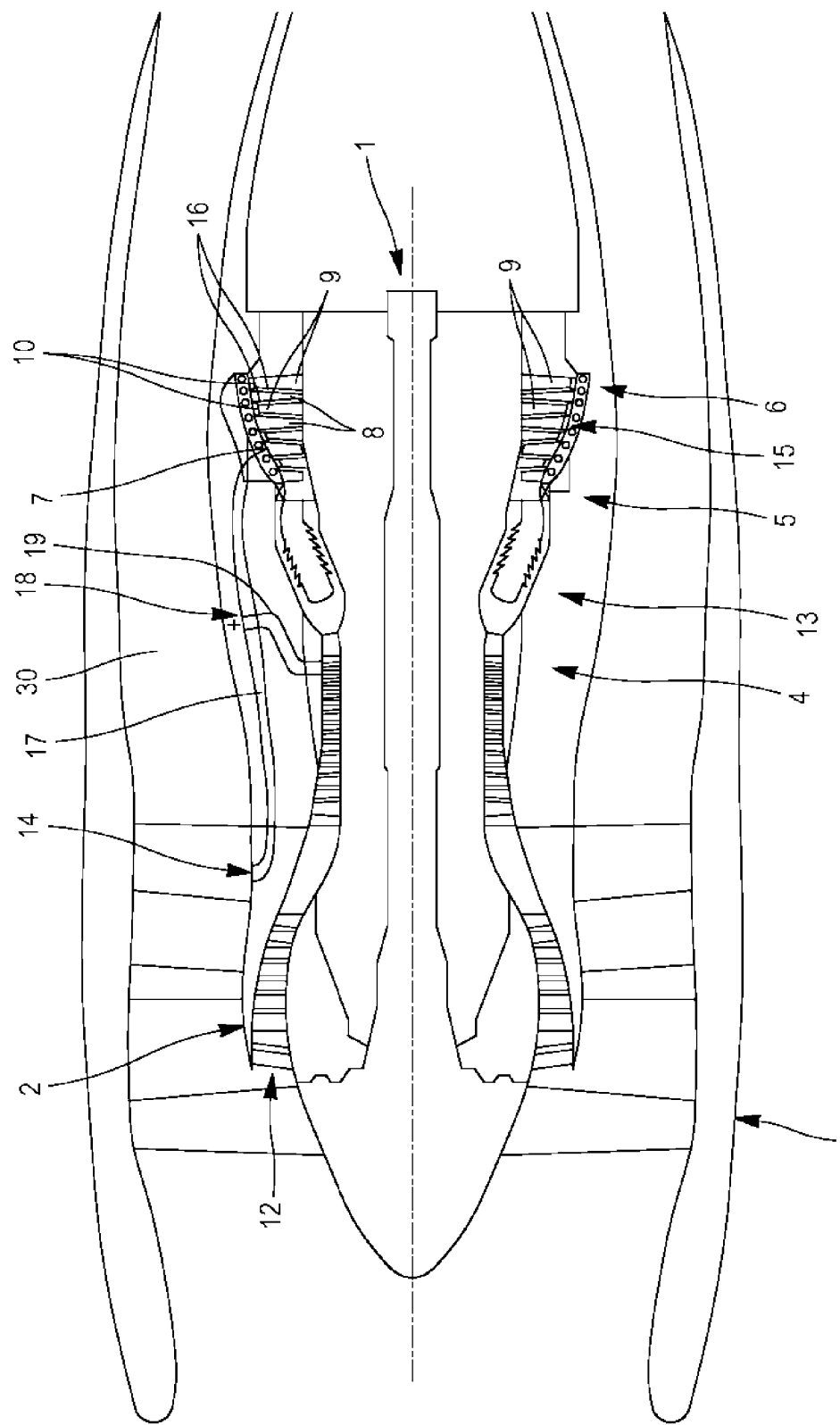

Shown in FIG. 1 is a ventilation device of a known type comprising manifolds 16 which are typically in the form of rings perforated vertically above the turbine casing 7 so as to spray air onto the turbine casing 7.

Figure 2:
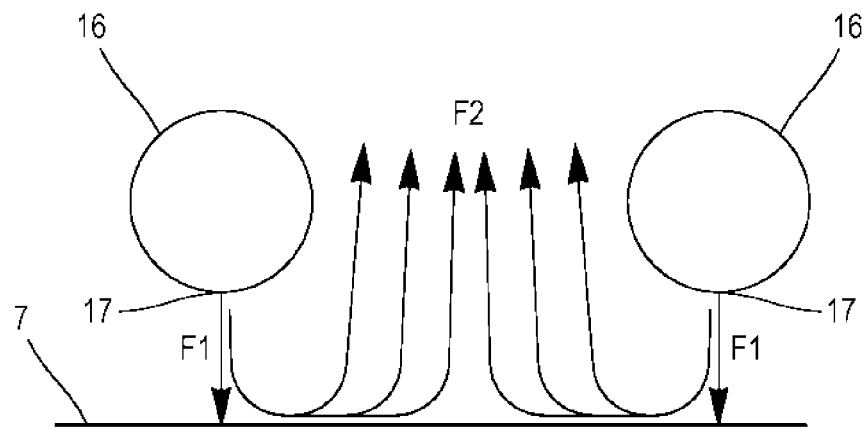
FIG. 2 illustrates a disposition of manifolds in a known type of ventilation device.

In relation with FIG. 2, the Applicant has observed that an air flow sprayed toward the turbine casing 7 will be heated by contact with the latter.

For this reason, a stream of post-impact hot air F2 is reflected from the turbine casing 7 toward the manifolds so that it can heat the latter and therefore the flow of cold air F1 emerging from them.

Thus, taking into account that several manifolds are disposed side by side, hot air derived from the impact of cold air on the turbine casing will heat the adjoining manifold(s), which reduces the cooling performance of the casing.

Figure 3:
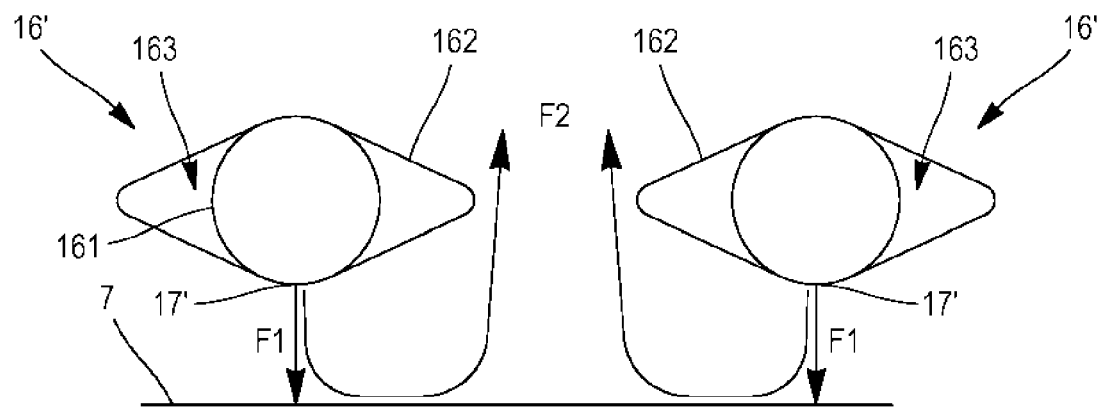
FIG. 3 illustrates a disposition of manifolds in a ventilation device according to an embodiment of the invention.

In order to avoid this problem, the Application has modified the manifolds of FIG. 2 and of FIG. 1 (still positioned at the same location in the turbomachine of FIG. 1) in relation to FIG. 3 and proposes a ventilation device comprising a plurality of manifolds 16', each comprising a main ring 161 in which an air flow circulates, and a shield 162 configured to isolate the main ring from an air flow reflected from the turbine casing 7 toward the manifolds 16' after having been sprayed toward the turbine casing 7.

The main ring 161 comprises openings 17' configured to spray an air flow toward the turbine casing 7.

As can be seen in FIG. 3, an air flow F2 derived from the turbine casing 7 after having impacted the turbine casing is reflected toward the manifolds. By in comparison with the same air flow in the prior art configuration (see FIG. 2), it is farther away from the main ring.

Thanks to this shield 162, dead zones inaccessible by the post-impact stream F2 are created around the main ring. These dead zones thermally isolate the main ring 161 reducing, with respect to the prior art, the temperature of the cold air flow F1 and improving the effectiveness of the cooling device.

The shield can completely surround the main ring and comprises openings aligned on the openings of the main ring.

Advantageously, the shield 162 extends tangentially from the openings of the manifold, the shield being in intimate contact with the main ring at the openings. Such contact makes it possible to limit the head loss during expulsion of air from the main ring toward the turbine casing 7.

Likewise, advantageously, the shield extends tangentially from the manifold from an intimate contact zone, between the manifold and the shield, diametrically opposed to the openings. Such contact makes it possible to limit the external bulk and makes it possible to take advantage of the cold air which circulates in the secondary jet above and of the exchange by radiation with the nacelle which, for its part, is cold.

In order to limit the radial bulk of the shields, the latter has the shape of an ellipse. It is also possible to provide a rectangular shape, or an oval one.

Figure 4:
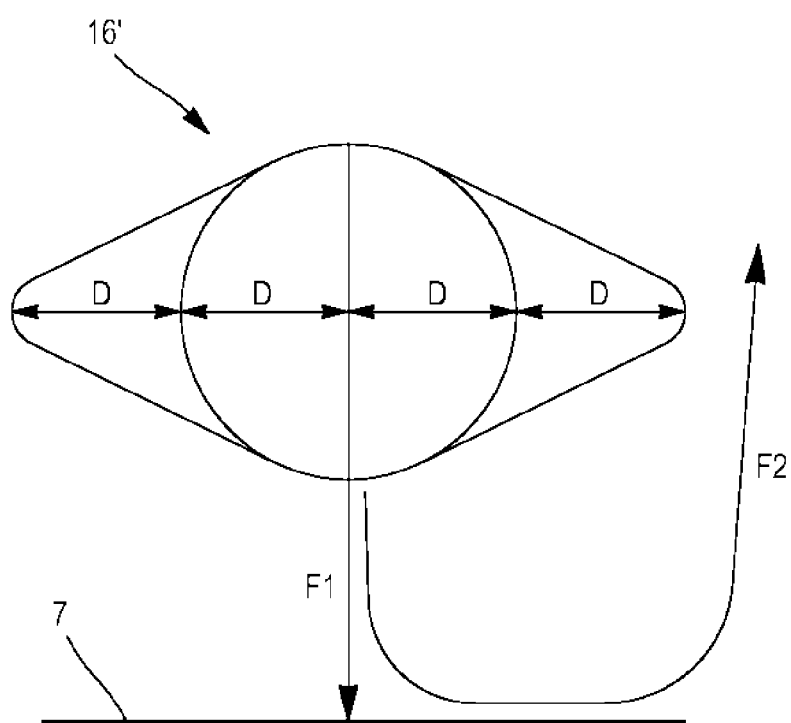
FIG. 4 illustrates a manifold of a ventilation device according to an embodiment of the invention.

In the case of an elliptical shape, as can be seen in FIG. 4, the ellipse has a major axis twice as large as the diameter D of the cross-section of the manifold.

The shield 162 can be of the same material as the manifold, for example a chromium-nickel based alloy.

The shield can be hollow, the cavity 163 defined between the shield and the manifold can be filled with air or argon. Air will however be preferred, as it is a better insulator and has a lower cost.

The invention claimed is:

1. A ventilation device for a turbine casing of a turbomachine comprising a plurality of manifolds configured to spray air onto the turbine casing, the manifolds being disposed side by side, each manifold comprising a main ring in which air circulates, the main ring comprising openings configured to spray an air flow toward the turbine casing, each manifold comprising a shield configured to isolate the main ring from an air flow reflected from the turbine casing toward the manifolds after having been sprayed toward the turbine casing, each shield surrounds the main ring by delimiting a cavity between the main ring and the shield, the shield comprising openings aligned on the openings of the main ring.

2. The ventilation device according to claim 1, wherein each shield extends tangentially from the openings of each manifold, the shield being in intimate contact with the main ring at the openings.

3. The ventilation device casing according to claim 1, wherein each shield extends tangentially from each manifold from an intimate contact zone, between each manifold and each shield, diametrically opposed to the openings.

4. The ventilation device according to claim 1, wherein the cross-section of each shield has the shape of an ellipse.

5. The ventilation device according to claim 4, wherein the ellipse has a major axis twice as large as the diameter of the cross-section of the manifold.

6. The ventilation device according to claim 1, wherein the cavity is filled with air or argon.

7. A turbomachine comprising a turbine which comprises the ventilation device according to claim 1.

* * * * *